United States Patent
Cook (10) Patent No.: US 8,341,648 B1
(45) Date of Patent: Dec. 25, 2012

(54) AUTOMATIC VIRTUALIZATION BASED ON USER-DEFINED CRITERIA

(75) Inventor: Randall R. Cook, Springville, UT (US)

(73) Assignee: Symantec Corporation, Mountain View, CA (US)

( * ) Notice: Subject to any disclaimer, the term of this patent is extended or adjusted under 35 U.S.C. 154(b) by 1338 days.

(21) Appl. No.: 12/024,079

(22) Filed: Jan. 31, 2008

Related U.S. Application Data (63) Continuation-in-part of application No. 11/026,520, filed on Dec. 30, 2004, now Pat. No. 7,620,956, which is a continuation-in-part of application No. 10/459,936, filed on Jun. 11, 2003, now Pat. No. 7,117,495, application No. 12/024,079, which is a continuation-in-part of application No. 11/027,489, filed on Dec. 30, 2004, now Pat. No. 7,496,931, and a continuation-in-part of application No. 11/081,856, (Continued)

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/318; 719/319; 717/168

(58) Field of Classification Search .................. 719/318, 719/319; 718/1; 717/168; 726/1
See application file for complete search history.

(56) References Cited

U.S. PATENT DOCUMENTS 6,751,657 B1 * 6/2004 Zothner ........................ 709/220

(Continued)

OTHER PUBLICATIONS

Stansel, Inside Citrix Presentation Server's Application Isolation Environments, VirtualizationAdmin.com, Dec. 28, 2005, 3 pages.*

(Continued)

*Primary Examiner* — Diem Cao
(74) *Attorney, Agent, or Firm* — Advantedge Law Group (57) ABSTRACT

The disclosure is directed to automatic virtualization based on user-defined criteria. In one example, data representative of user-defined criteria is received, a virtualization heuristic is generated based on the user-defined criteria, the virtualization heuristic is activated, an occurrence of an event defined by the user-defined criteria is detected, and at least one virtualization operation is automatically performed in response to the detected event. In certain embodiments, the virtualization operation is selected based on the user-defined criteria. In certain embodiments, the virtualization operation includes capturing file system and configuration activity associated with the detected event and storing data representative of the captured file system and configuration activity to a virtual layer.

18 Claims, 7 Drawing Sheets

Related U.S. Application Data filed on Mar. 16, 2005, now Pat. No. 7,512,977, which is a continuation-in-part of application No. 10/459,936, application No. 12/024,079, which is a continuation-in-part of application No. 11/082,194, filed on Mar. 16, 2005, now Pat. No. 7,549,164, which is a continuation-in-part of application No. 10/459,936, application No. 12/024,079, which is a continuation-in-part of application No. 11/324,565, filed on Jan. 3, 2006, now Pat. No. 7,886,291, which is a continuation-in-part of application No. 10/459,936, said application No. 11/324,565 is a continuation-in-part of application No. 10/459,768, filed on Jun. 11, 2003, now Pat. No. 7,162,724, and a continuation-in-part of application No. 10/459,870, filed on Jun. 11, 2003, now Pat. No. 7,165,260, and a continuation-in-part of application No. 11/026,520, which is a continuation-in-part of application No. 10/459,936, said application No. 11/324,565 is a continuation-in-part of application No. 11/027,489, and a continuation-in-part of application No. 11/081,856, which is a continuation-in-part of application No. 10/459,936, said application No. 11/324,565 is a continuation-in-part of application No. 11/082,194, which is a continuation-in-part of application No. 10/459,936, application No. 12/024,079, which is a continuation-in-part of application No. 11/324,571, filed on Jan. 3, 2006, which is a continuation-in-part of application No. 10/459,936, said application No. 11/324,571 is a continuation-in-part of application No. 10/459,768, and a continuation-in-part of application No. 10/459,870, and a continuation-in-part of application No. 11/026,520, and a continuation-in-part of application No. 10/459,936, and a continuation-in-part of application No. 11/027,489, and a continuation-in-part of application No. 11/081,856, which is a continuation-in-part of application No. 10/459,936, said application No. 11/324,571 is a continuation-in-part of application No. 11/082,194, which is a continuation-in-part of application No. 10/459,936, application No. 12/024,079, which is a continuation-in-part of application No. 11/324,375, filed on Jan. 3, 2006, which is a continuation-in-part of application No. 10/459,936, said application No. 11/324,375 is a continuation-in-part of application No. 10/459,870, and a continuation-in-part of application No. 11/026,520, and a continuation-in-part of application No. 10/459,936, and a continuation-in-part of application No. 11/027,489, and a continuation-in-part of application No. 11/081,856, which is a continuation-in-part of application No. 10/459,936, said application No. 11/324,375 is a continuation-in-part of application No. 11/082,194, which is a continuation-in-part of application No. 10/459,936, application No. 12/024,079, which is a continuation-in-part of application No. 11/324,607, filed on Jan. 3, 2006, now Pat. No. 7,461,096, which is a continuation-in-part of application No. 10/459,936, said application No. 11/324,607 is a continuation-in-part of application No. 10/459,768, and a continuation-in-part of application No. 10/459,870, and a continuation-in-part of application No. 11/026,520, and a continuation-in-part of application No. 10/459,936, and a continuation-in-part of application No. 11/027,489, and a continuation-in-part of application No. 11/081,856, which is a continuation-in-part of application No. 10/459,936, said application No. 11/324,607 is a continuation-in-part of application No. 11/082,194, which is a continuation-in-part of application No. 10/459,936, application No. 12/024,079, which is a continuation-in-part of application No. 11/324,545, filed on Jan. 3, 2006, now Pat. No. 7,542,988, which is a continuation-in-part of application No. 10/459,936, said application No. 11/324,545 is a continuation-in-part of application No. 10/459,768, and a continuation-in-part of application No. 10/459,870, and a continuation-in-part of application No. 11/026,520, and a continuation-in-part of application No. 10/459,936, and a continuation-in-part of application No. 11/027,489, and a continuation-in-part of application No. 11/081,856, which is a continuation-in-part of application No. 10/459,936, said application No. 11/324,545 is a continuation-in-part of application No. 11/082,194, said application No. 11/082,194 is a continuation-in-part of application No. 10/459,936, application No. 12/024,079, which is a continuation-in-part of application No. 11/324,572, filed on Jan. 3, 2006, now Pat. No. 7,877,413, which is a continuation-in-part of application No. 10/459,936, said application No. 11/324,572 is a continuation-in-part of application No. 10/459,768, and a continuation-in-part of application No. 10/459,870, and a continuation-in-part of application No. 11/026,520, and a continuation-in-part of application No. 10/459,936, and a continuation-in-part of application No. 11/027,489, and a continuation-in-part of application No. 11/081,856, which is a continuation-in-part of application No. 10/459,936, said application No. 11/324,572 is a continuation-in-part of application No. 11/082,194, which is a continuation-in-part of application No. 10/459,936, application No. 12/024,079, which is a continuation-in-part of application No. 11/324,573, filed on Jan. 3, 2006, now Pat. No. 7,461,086, which is a continuation-in-part of application No. 10/459,936, said application No. 11/324,573 is a continuation-in-part of application No. 10/459,768, and a continuation-in-part of application No. 10/459,870, and a continuation-in-part of application No. 11/026,520, and a continuation-in-part of application No. 10/459,936, and a continuation-in-part of application No. 11/027,489, and a continuation-in-part of application No. 11/081,856, which is a continuation-in-part of application No. 10/459,936, said application No. 11/324,573 is a continuation-in-part of application No. 11/082,194, which is a continuation-in-part of application No. 10/459,936, application No. 12/024,079, which is a continuation-in-part of application No. 11/324,496, filed on Jan. 3, 2006, now Pat. No. 7,970,789, which is a continuation-in-part of application No. 10/459,936, said application No. 11/324,496 is a continuation-in-part of application No. 10/459,768, and a continuation-in-part of application No. 10/459,870, and a continuation-in-part of application No. 11/026,520, and a continuation-in-part of application No. 10/459,936, and a continuation-in-part of application No. 11/027,489, and a continuation-in-part of application No. 11/081,856, which is a continuation-in-part of application No. 10/459,936, said application No. 11/324,496 is a continuation-in-part of application No. 11/082,194, which is a continuation-in-part of application No. 10/459,936, application No. 12/024,079, which is a continuation-in-part of application No. 11/528,858, filed on Sep. 28, 2006, now Pat. No. 7,945,897, which is a continuation-in-part of application No. 10/459,936, said application No. 11/528,858 is a continuation-in-part of application No. 10/459,768, and a continuation-in-part of application No. 10/459,870, and a continuation-in-part of application No. 11/026,520, and a continuation-in-part of application No. 10/459,936, and a continuation-in-part of application No. 11/027,489, and a continuation-in-part of application No. 11/081,856, which is a continuation-in-part of application No. 10/459,936, said application No. 11/528,858 is a continuation-in-part of application No. 11/082,194, which is a continuation-in-part of application No. 10/459,936, said application No. 11/528,858 is a continuation-in-part of application No. 11/324,565, which is a continuation-in-part of application No. 10/459,936, said application No. 11/324,565 is a continuation-in-part of application No. 10/459,768, and a continuation-in-part of application No. 10/459,870, and a continuation-in-part of application No. 11/026,520, and a continuation-in-part of application No. 10/459,936, said application No. 11/324,565 is a continuation-in-part of application No. 11/027,489, and a continuation-in-part of application No. 11/081,856, which is a continuation-in-part of application No. 10/459,936, said application No. 11/324,565 is a continuation-in-part of application No. 11/082,194, which is a continuation-in-part of application No. 10/459,936, said application No. 11/528,858 is a continuation-in-part of application No. 11/324,571, which is a continuation-in-part of application No. 10/459,936, said application No. 11/324,571 is a continuation-in-part of application No. 10/459,768, and a continuation-in-part of application No. 10/459,870, and a continuation-in-part of application No. 11/026,520, and a continuation-in-part of application No. 10/459,936, and a continuation-in-part of application No. 11/027,489, and a continuation-in-part of application No. 11/081,856, said application No. 11/082,194 is a continuation-in-part of application No. 10/459,936, said application No. 11/324,571 is a continuation-in-part of application No. 11/082,194, which is a continuation-in-part of application No. 10/459,936, said application No. 11/324,545 is a continuation-in-part of application No. 10/459,936, said application No. 11/528,858 is a continuation-in-part of application No. 11/324,375, which is a continuation-in-part of application No. 10/459,936, said application No. 11/324,375 is a continuation-in-part of application No. 10/459,768, and a continuation-in-part of application No. 10/459,870, and a continuation-in-part of application No. 11/026,520, and a continuation-in-part of application No. 10/459,936, and a continuation-in-part of application No. 11/027,489, and a continuation-in-part of application No. 11/081,856, which is a continuation-in-part of application No. 10/459,936, said application No. 11/324,375 is a continuation-in-part of application No. 11/082,194, which is a continuation-in-part of application No. 10/459,936, said application No. 11/528,858 is a continuation-in-part of application No. 11/324,607, which is a continuation-in-part of application No. 10/459,936, said application No. 11/324,607 is a continuation-in-part of application No. 10/459,768, and a continuation-in-part of application No. 10/459,870, and a continuation-in-part of application No. 11/026,520, and a continuation-in-part of application No. 10/459,936, and a continuation-in-part of application No. 11/027,489, and a continuation-in-part of application No. 11/081,856, which is a continuation-in-part of application No. 10/459,936, said application No. 11/324,607 is a continuation-in-part of application No. 11/082,194, which is a continuation-in-part of application No. 10/459,936, said application No. 11/324,545 is a continuation-in-part of application No. 10/459,768, and a continuation-in-part of application No. 10/459,870, and a continuation-in-part of application No. 11/026,520, and a continuation-in-part of application No. 10/459,936, and a continuation-in-part of application No. 11/027,489, and a continuation-in-part of application No. 11/081,856, which is a continuation-in-part of application No. 10/459,936, said application No. 11/324,545 is a continuation-in-part of application No. 11/082,194, which is a continuation-in-part of application No. 10/459,936, said application No. 11/528,858 is a continuation-in-part of application No. 11/324,572, which is a continuation-in-part of application No. 10/459,936, said application No. 11/324,572 is a continuation-in-part of application No. 10/459,768, and a continuation-in-part of application No. 10/459,870, and a continuation-in-part of application No. 11/026,520, and a continuation-in-part of application No. 10/459,936, and a continuation-in-part of application No. 11/027,489, and a continuation-in-part of application No. 11/081,856, which is a continuation-in-part of application No. 10/459,936, said application No. 11/324,572 is a continuation-in-part of application No. 11/082,194, which is a continuation-in-part of application No. 10/459,936, said application No. 11/528,858 is a continuation-in-part of application No. 11/324,573, which is a continuation-in-part of application No. 10/459,936, said application No. 11/324,573 is a continuation-in-part of application No. 10/459,768, and a continuation-in-part of application No. 10/459,870, and a continuation-in-part of application No. 11/026,520, and a continuation-in-part of application No. 10/459,936, said application No. 11/324,573 is a continuation-in-part of application No. 11/027,489, and a continuation-in-part of application No. 11/081,856, which is a continuation-in-part of application No. 10/459,936, and a continuation-in-part of application No. 11/082,194, which is a continuation-in-part of application No. 10/459,936, said application No. 11/528,858 is a continuation-in-part of application No. 11/324,496, which is a continuation-in-part of application No.

10/459,936, said application No. 11/324,496 is a continuation-in-part of application No. 10/459,768, and a continuation-in-part of application No. 10/459,870, and a continuation-in-part of application No. 11/026,520, and a continuation-in-part of application No. 10/459,936, and a continuation-in-part of application No. 11/027,489, and a continuation-in-part of application No. 11/081,856, which is a continuation-in-part of application No. 10/459,936, said application No. 11/324,496 is a continuation-in-part of application No. 11/082,194, which is a continuation-in-part of application No. 10/459,936, application No. 12/024,079, which is a continuation-in-part of application No. 11/960,706, filed on Dec. 20, 2007.

(60) Provisional application No. 60/533,388, filed on Dec. 30, 2003, provisional application No. 60/387,969, filed on Jun. 12, 2002.

(56) References Cited

U.S. PATENT DOCUMENTS

| | | | |
|---|---|---|---|
| 7,117,495 B2 | 10/2006 | Blaser et al. | |
| 7,162,724 B2 | 1/2007 | Blaser et al. | |
| 7,165,260 B2 | 1/2007 | Blaser et al. | |
| 7,461,086 B1 | 12/2008 | Hurren et al. | |
| 7,461,096 B1 | 12/2008 | Hurren et al. | |
| 7,512,977 B2 | 3/2009 | Cook et al. | |
| 7,519,963 B1 | 4/2009 | Blaser et al. | |
| 7,542,988 B1 | 6/2009 | Cook et al. | |
| 7,549,164 B2 | 6/2009 | Cook et al. | |
| 7,620,956 B2 | 11/2009 | Cook et al. | |
| 7,877,413 B1 | 1/2011 | Cook et al. | |
| 7,886,291 B1 | 2/2011 | Jones et al. | |
| 7,945,897 B1 | 5/2011 | Cook | |
| 7,970,789 B1 | 6/2011 | Blaser et al. | |
| 8,010,961 B1 | 8/2011 | Cook et al. | |
| 8,112,767 B1 | 2/2012 | Cook | |
| 2003/0022657 A1* | 1/2003 | Herschberg et al. | 455/414 |
| 2005/0198303 A1* | 9/2005 | Knauerhase et al. | 709/227 |
| 2006/0259949 A1* | 11/2006 | Schaefer et al. | 726/1 |
| 2007/0168937 A1* | 7/2007 | Mallick | 717/106 |
| 2008/0052776 A1* | 2/2008 | Prabhat et al. | 726/15 |
| 2008/0301316 A1* | 12/2008 | Alpern et al. | 709/231 |
| 2010/0138823 A1* | 6/2010 | Thornley | 717/174 |
| 2010/0205393 A1* | 8/2010 | Yueh | 711/162 |
| 2011/0061045 A1* | 3/2011 | Phillips | 717/173 |

OTHER PUBLICATIONS

Altiris, Software Virtulization Solution, Altiris, 2005, 2 pages.*
Altiris, Altifis Software Virtualization Solution 2.0, Altiris Inc., Jan. 31, 2006, 19 pages.*
Software virtualization and Altiris, hObbel.pOggel.org, Jul. 2006, 3 pages.*
Altiris, Software Virtualization Solution 2.1 Reference, Jun. 14, 2007, Altiris Inc., pp. 1-31.*
Jared Blaser; Process Tracking Application Layered System; U.S. Appl. No. 11/324,571, filed Jan. 3, 2006.
Jeremy Hurren; Feature Based Software Virtualization; U.S. Appl. No. 11/960,706, filed Dec. 20, 2007.
Randall Cook; Automatic Virtualization Based on User-Defined Criteria; U.S. Appl. No. 12/024,079, filed Jan. 31, 2008.

* cited by examiner

AUTOMATIC VIRTUALIZATION BASED ON USER-DEFINED CRITERIA

CROSS-REFERENCE INFORMATION

This is a continuation-in-part of U.S. patent application Ser. No. 11/026,520 filed Dec. 30, 2004, which: (1) claims the benefit of U.S. provisional patent application Ser. No. 60/533,388 filed on Dec. 30, 2003; and (2) is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002.

This is a continuation-in-part of U.S. patent application Ser. No. 11/027,489 filed Dec. 30, 2004, which claims the benefit of U.S. provisional patent application Ser. No. 60/533,388 filed on Dec. 30, 2003.

This is a continuation-in-part of U.S. patent application Ser. Nos. 11/081,856 and 11/082,194, each filed Mar. 16, 2005, each of which is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002.

This is a continuation-in-part of U.S. patent application Ser. Nos. 11/324,565, 11/324,571, 11/324,375, 11/324,607, 11/324,545, 11/324,572, 11/324,573 and 11/324,496, each filed Jan. 3, 2006, and each of which is: (1) a continuation-in-part of U.S. patent application Ser. Nos. 10/459,936 (now U.S. Pat. No. 7,117,495 issued Oct. 3, 2006), 10/459,768 (now U.S. Pat. No. 7,162,724 issued Jan. 9, 2007), and 10/459,870 (now U.S. Pat. No. 7,165,260 issued Jan. 16, 2007) filed Jun. 11, 2003, which each claim the benefit of U.S. provisional patent application Ser. No. 60/387,969 filed on Jun. 12, 2002; (2) a continuation-in-part of U.S. patent application Ser. No. 11/026,520 filed Dec. 30, 2004, which claims the benefit of U.S. provisional patent application Ser. No. 60/533,388 filed on Dec. 30, 2003; (3) a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002; (4) a continuation-in-part of U.S. patent application Ser. No. 11/027,489 filed Dec. 30, 2004, which claims the benefit of U.S. provisional patent application Ser. No. 60/533,388 filed on Dec. 30, 2003; and (5) a continuation-in-part of U.S. patent application Ser. Nos. 11/081,856 and 11/082,194, each filed Mar. 16, 2005, each of which is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002.

This is a continuation-in-part of U.S. patent application Ser. No. 11/528,858 filed Sep. 28, 2006, which is: (1) a continuation-in-part of Ser. No. 10/459,936 (now U.S. Pat. No. 7,117,495 issued Oct. 3, 2006), Ser. No. 10/459,768 (now U.S. Pat. No. 7,162,724 issued Jan. 9, 2007), and Ser. No. 10/459,870 (now U.S. Pat. No. 7,165,260 issued Jan. 16, 2007) filed Jun. 11, 2003, which each claim the benefit of U.S. provisional patent application Ser. No. 60/387,969 filed on Jun. 12, 2002; (2) a continuation-in-part of U.S. patent application Ser. Nos. 11/026,520 filed Dec. 30, 2004, which claims the benefit of U.S. provisional patent application Ser. No. 60/533,388 filed on Dec. 30, 2003 and is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002; (3) a continuation-in-part of U.S. patent application Ser. No. 11/027,489 filed Dec. 30, 2004, which claims the benefit of U.S. provisional patent application Ser. No. 60/533,388 filed on Dec. 30, 2003; (4) a continuation-in-part of U.S. patent application Ser. Nos. 11/081,856 and 11/082,194 each filed on Mar. 16, 2005, each of which is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002; (5) and a continuation-in-part of U.S. patent application Ser. Nos. 11/324,565, 11/324,571, 11/324,375, 11/324,607, 11/324,545, 11/324,572, 11/324,573 and 11/324,496 filed Jan. 3, 2006, each of which is: (a) a continuation-in-part of U.S. patent application Ser. Nos. 10/459,936 (now U.S. Pat. No. 7,117,495 issued Oct. 3, 2006), 10/459,768 (now U.S. Pat. No. 7,162,724 issued Jan. 9, 2007), and 10/459,870 (now U.S. Pat. No. 7,165,260 issued Jan. 16, 2007) filed Jun. 11, 2003, which each claim the benefit of U.S. provisional patent application Ser. No. 60/387,969 filed on Jun. 12, 2002; (b) a continuation-in-part of U.S. patent application Ser. No. 11/026,520 filed Dec. 30, 2004, which claims the benefit of U.S. provisional patent application Ser. No. 60/533,388 filed on Dec. 30, 2003; (c) a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002; (d) a continuation-in-part of U.S. patent application Ser. No. 11/027,489 filed Dec. 30, 2004, which claims the benefit of U.S. provisional patent application Ser. No. 60/533,388 filed on Dec. 30, 2003; and (e) a continuation-in-part of U.S. patent application Ser. Nos. 11/081,856 and 11/082,194 filed Mar. 16, 2005, each of which is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002.

This is a continuation-in-part of U.S. patent application Ser. No. 11/960,706 filed Dec. 20, 2007.

The disclosures of the above patents and patent applications are hereby incorporated by reference in their entirety.

BACKGROUND INFORMATION

In computing, file system and registry libraries are typically used to maintain data descriptive of the configuration of a computing device. A file system generally includes data for translating a physical sector of a memory disc to a logical structure. The logical structure can be used by a computer operating system to access data stored in physical memory. Registry libraries generally include configuration data such as setup, user preference, software, hardware, and system parameters information.

Certain operations, when executed by a computing device, introduce changes to file system and/or registry data. For example, operations may cause such data to be created, deleted, or modified. In some situations, changes to the file system or registry data may be undesirable or unmanageable, or may introduce instability into a computing system. As an example, when a computer program is conventionally installed to a computing device, the file system and/or registry data is typically updated. These changes can cause the computing device to become susceptible, or more susceptible than before, to potential problems such as unwanted deletions of configuration data, data redundancies, computer program versioning issues, execution of unwanted processes, inoperability of computer programs, and conflicts between computer programs.

Such problems are exacerbated for an administrator or organization maintaining a computer system having a large number of computing devices and associated users. In such a configuration, events such as rogue installations of computer programs can easily introduce any of the problems listed above. Finding and correcting such problems can be very difficult and time consuming, if not impossible, in a large computer system.

To a certain degree, conventional system restore technologies can be used to restore file system and registry settings to a previous state when a problem is introduced into a computing system. Conventional system restore technologies typically capture static snapshots of computing system configurations. Such snapshots must be captured in advance of problems occurring and stored in order to be available when problems do occur. System restore snapshots are typically system-wide and can, therefore, tie up significant memory resources.

BRIEF DESCRIPTION OF THE DRAWINGS

Various embodiments are described with reference to the accompanying drawings, wherein like reference numbers designate like elements, and in which.

DETAILED DESCRIPTION

The disclosure is directed to automatic virtualization based on user-defined criteria. It should be appreciated that the examples disclosed herein may be implemented in numerous ways, including as one or more processes, apparatuses, systems, devices, methods, computer readable media, or computer program products embodied on computer readable media. Exemplary systems, apparatuses, computer program products embodied on computer readable media, and methods for automatic software virtualization based on one or more user-defined criteria are described herein.

As used herein, the term "virtualization" refers to performance of one or more operations to virtually install software, including data related to the software or software activity, to a computing device such that the software may be conveniently enabled (i.e., "turned on") and disabled (i.e., "turned off"). When virtually installed software is enabled, access requests associated with the virtually installed software are generally redirected from a base file system and configuration to one or more memory locations to which the software and/or related data has been virtually installed. When the virtually installed software is disabled, access requests are not redirected, but allowed to pass through to the base file system and configuration. Thus, virtually installed and enabled software may be executed without changing the base file system and configuration of a computing device. Examples of virtualization operations will be described further below.

As used herein, the term "software" refers broadly to any set of computer readable instructions embodied on one or more computer readable media, the instructions being executable by a computing device. Software may include one or more computer programs or applications. Data related to software may include configuration data such as file system and registry data associated with the software, including data representative of file system and configuration activity associated with operation and/or installation of the software.

As described in more detail further below, data representative of user-defined criteria may be received and utilized to selectively determine one or more virtualization operations to be performed. For example, one or more virtualization operations may be automatically executed in response to a detected occurrence of an event defined by one or more user-defined criteria. The virtualization operations may be selected based at least in part on the user-defined criteria. Accordingly, a user may provide user-defined criteria to be used to control virtualization operations, including when, how, and what virtualization operations are performed. In certain embodiments, the user-defined criteria may provide a granular level of user control over virtualization operations, including capabilities for controlling selective and automatic virtualization of software and/or related data associated with a specific event, process, or other user-defined criterion. This gives a user (e.g., an administrator of a computing system) significant flexibility for controlling virtualization operations and for protecting a computing system on a granular level from unwanted, unmanageable, and potentially harmful events such as rogue installations of software.

Figure 1:
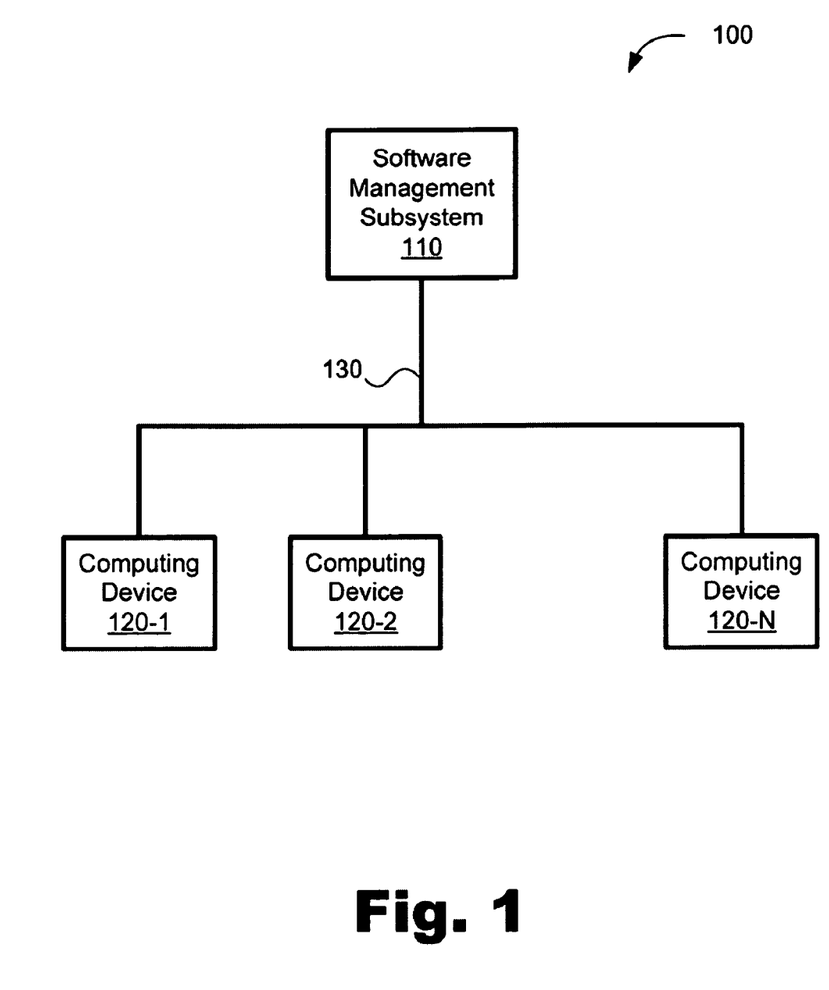
FIG. 1 illustrates an exemplary computing system configured for automatic virtualization based on user-defined criteria.

Turning now to the drawings, FIG. 1 illustrates an exemplary computing system 100 (or simply "the system 100") configured for automatic virtualization based on user-defined criteria as described herein. As shown, the computing system 100 may include a software management subsystem 110 communicatively coupled to computing devices 120-1 through 120-N (collectively "the computing devices 120"). The software management subsystem 110 and computing devices 120 may communicate with one another using any suitable communication technologies. For example, the software management subsystem 110 and computing devices 120 may communicate over a network 130 using any suitable communication technologies, including suitable network communication technologies, devices, signals, and protocols capable of supporting the processes and communications described herein. Network 130 may include any type, number, and configuration of networks capable of carrying communication signals between devices connected to the network 130, including but not limited to a local area network, a wide area network, a peer-to-peer network, a wireless network, a data network, an intranet, the Internet, and combinations or sub-combinations thereof. In other embodiments, the software management subsystem 110 and the computing devices 120 may communicate directly, such as over a communication bus or other communication link.

In certain embodiments, computing system 100 may include any computer hardware and/or instructions (e.g., software programs), or combinations of software and hardware, configured to perform the processes described herein. In particular, it should be understood that system 100 may include any of a number of computing devices, and may employ any of a number of computer operating systems, including, but by no means limited to, known versions and/or varieties of the Microsoft Windows, UNIX, Macintosh, and Linux operating systems.

Accordingly, the processes described herein may be implemented at least in part as instructions, e.g., one or more computer program products, embodied on computer readable media and executable by one or more computing devices. In general, a processor (e.g., a microprocessor) receives instructions, e.g., from a memory, a computer readable medium, etc., and executes those instructions, thereby performing one or more processes, including one or more of the processes described herein. Such instructions may be stored and transmitted using a variety of known computer readable media.

A computer readable medium (also referred to as a processor readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary computing system 100 is shown in FIG. 1, the exemplary components illustrated in FIG. 1 are not intended to be limiting. Indeed, additional or alternative components, implementations, or computing systems may be used to implement the principles and processes described herein.

Software management subsystem 110 may include or be implemented in one or more devices, including one or more devices configured to communicate with computing devices 120 over network 130. In certain embodiments, for example, software management subsystem 110 may include or be embodied on one or more server devices, which may be configured to operate server software such as Altiris' Notification Server™ software provided by Altiris, Inc., a division of Symantec Corporation. Software management subsystem 110 may include and may be configured to execute computer readable instructions (e.g., one or more computer program products) embodied on one or more computer readable media. The computer readable instructions may be configured to direct execution of one or more user input, user output, criteria definition, criteria activation, criteria deployment, and automatic software virtualization operations. Accordingly, in certain embodiments, a user of software management subsystem 110, such as an administrator or other privileged user of the system 100, may utilize the software management subsystem 110 to define criteria to be used to control automatic virtualization operations performed at one or more computing devices 120 or elsewhere in system 100, as described further below.

In certain embodiments, a user of a computing device 120, such as a privileged or non-privileged user in system 100, may utilize the computing device 120 to define criteria to be used to control automatic virtualization operations performed at the computing device and/or elsewhere in system 100. A computing device 120 may include any hardware (e.g., a processor) and computing instructions (e.g., one or more computer program products) capable of performing one or more of the processes described herein, including communicating with the software management subsystem 110, receiving user input defining criteria, activating the user-defined criteria, and automatically performing one of more virtualization operations based on the user-defined criteria. Computing device 120 may include, but is in no way limited to, a personal computer, a workstation, a personal digital assistant, or any device having a processor, memory, input and output devices, and at least one fixed disk. It is contemplated that the principles described herein may be applied to these and other computing systems and devices, both existing and yet to be developed, using the methods and principles disclosed herein. Likewise, although many of the examples below refer to a computing device with a single base file system and configuration, the concepts, principles, and examples disclosed below may be extended to provide user-defined automatic software virtualization functionality across several or many file systems and/or configurations (e.g., registries).

An exemplary virtualization system 200 will now be described with reference to FIGS. 2A-C. In certain embodiments, the virtualization system 200 may be implemented in a computing device environment of one or more suitable computing devices, including any of the computing devices 120. In other embodiments, certain components of the virtualization system 200 may be implemented in a computing device environment of one or more computing devices 120, and certain other components of the virtualization system 200 may be implemented in the software management subsystem 110. For example, virtualization system 200 may include a criteria manager 205, which may be implemented in a computing device 120 in certain embodiments, in the software management subsystem 110 in other embodiments, or distributed across both a computing device 120 and the software management subsystem 110 in other embodiments.

Figure 2A:
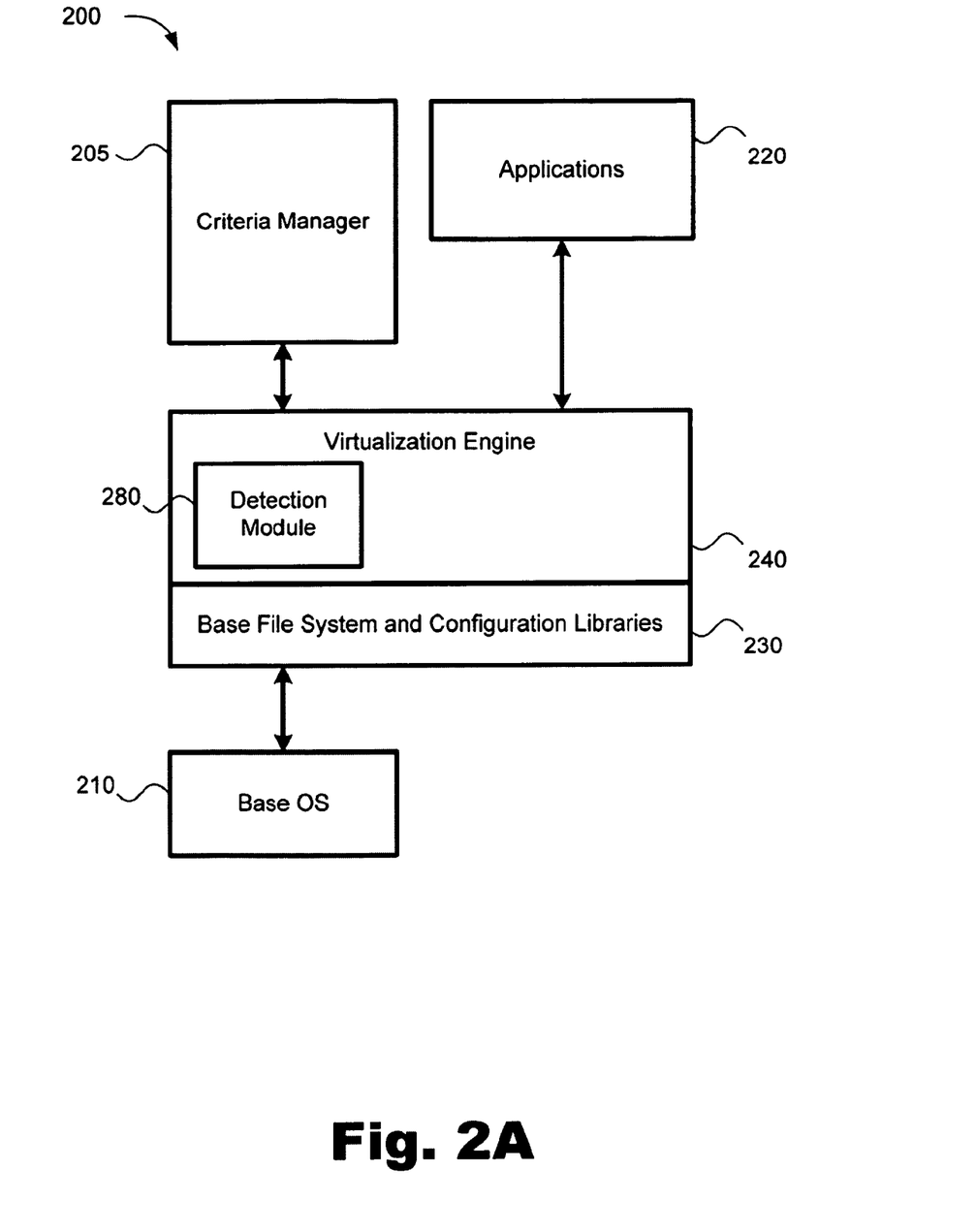
FIG. 2A illustrates an exemplary virtualization system in a computing device environment.
Figure 2B:
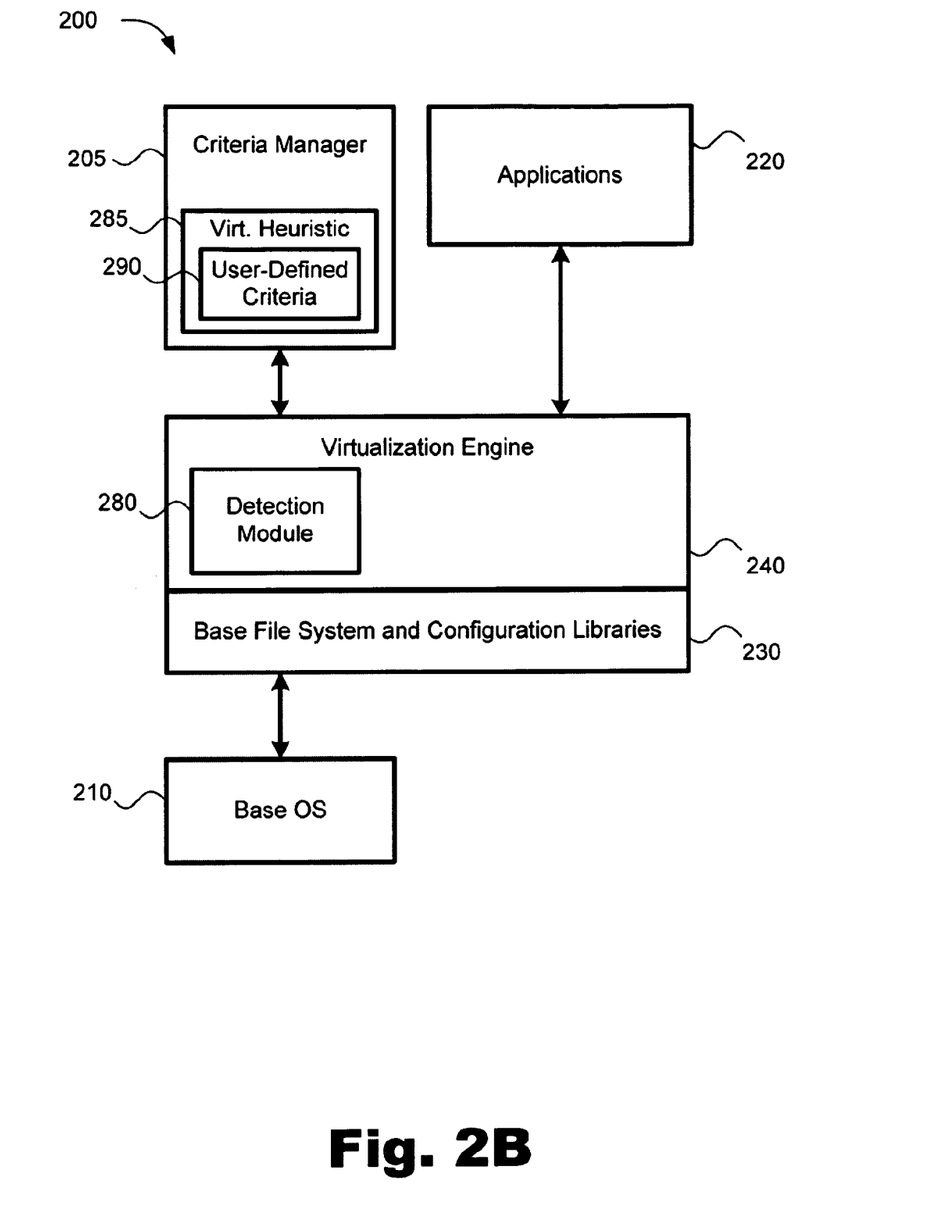
FIG. 2B illustrates the computing device environment of FIG. 2A with a virtual heuristic and user-defined criteria included therein.
Figure 2C:
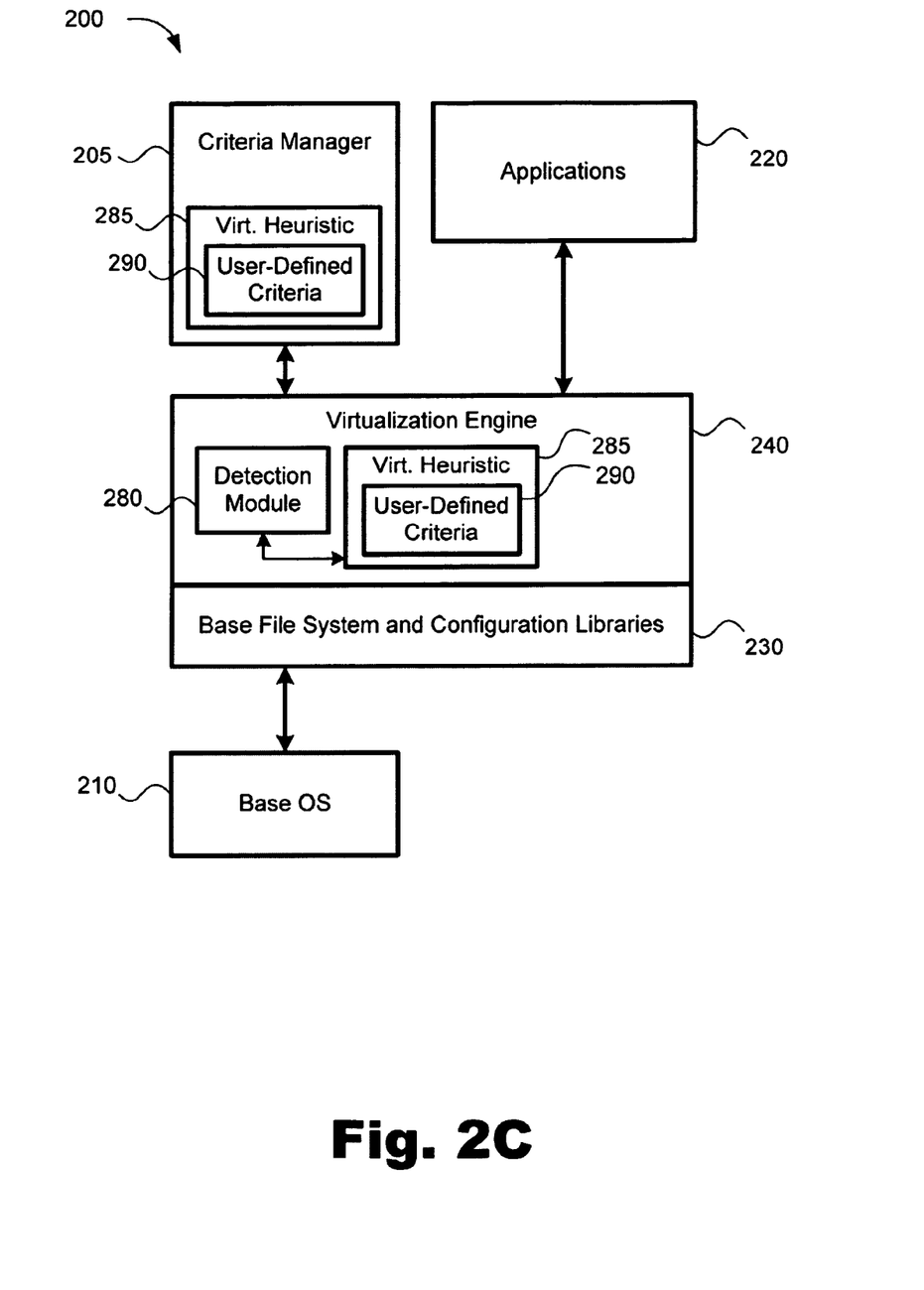
FIG. 2C illustrates the computing device environment of FIG. 2B with the virtual heuristic and user-defined criteria implemented in a virtualization engine.

As shown in FIGS. 2A-C, virtualization system 200 may be implemented in an exemplary computing device environment having a base operating system ("base OS") 210 forming a platform with which one or more applications 220 (e.g., software applications) can be run and files can be accessed in file systems. In certain embodiments, base OS 210 comprises Microsoft Windows operating system software.

Base OS 210 may include base configuration settings (e.g., registry settings) and files that are globally available to applications 220 for reading and writing operations. The configuration settings and files of the base OS 210 may be included in base file system and configuration libraries 230, also referred to as a base file system and configuration 230, for use in executing the functions of the base OS 210 including operating file systems, configuration settings such as registries, and other operating system functions. The base file system and configuration libraries 230, including the base files and configuration settings of the base OS 210, may be stored to a particular location in the memory of a computing device 120.

As shown in FIGS. 2A-C, the virtualization system 200 may include a virtualization engine 240, which may include any hardware (e.g., a processor), computer readable instructions (e.g., a computer program product), or combination thereof configured to perform one or more of the operations disclosed herein. In certain embodiments, virtualization engine 240 may be implemented as a software agent installed to a computing device 120. The virtualization engine 240 may include a detection module 280. The virtualization engine 240 and detection module 280, and exemplary operations that may be performed by the virtualization engine 240 and/or detection module 280, will be described further below.

Criteria manager 205 may be configured to receive user input defining user-defined criteria from a user of a computing device 120 or the software management subsystem 110. When implemented in a computing device 120, the criteria manager 205 may be configured to enable a user of the computing device 120 to define and manage criteria to control virtualization operations. When implemented at the software management subsystem 110, the criteria manager 205 may be configured to enable a user of the software management subsystem 110 (e.g., a network administrator) to define and manage criteria to control virtualization operations performed by the software management subsystem 110 or by one or more of the computing devices 120 communicatively coupled to the software management subsystem 110.

Criteria manager 205 may include hardware, computer-readable instructions embodied in a computer-readable medium, or a combination of hardware and computer-readable instructions. In certain embodiments, criteria manager 205 comprises computing instructions, e.g., a computer program product, implemented in a computer-readable medium and configured to direct a processor to perform one or more criteria management operations disclosed herein.

Criteria manager 205 may be configured to provide one or more criteria definition tools that may be utilized by a user of a computing device 120 or the software management subsystem 110 to provide input defining virtualization criteria. For example, criteria manager 205 may be configured to provide one or more user interfaces (e.g., graphical user interfaces) configured to provide output to and receive input from a user. Examples of criteria definition tools include, but are in no way limited to, one or more lists of selectable criteria options from which a user may select a set of one or more criteria, data fields into which a user may insert input defining criteria, and any other suitable mechanisms for receiving user input defining virtualization criteria. User input may be received, processed, and stored as data representing user-defined criteria for controlling automatic virtualization operations.

User-defined virtualization criteria may include any data defined by a user of a computing device 120 or the software management subsystem 110 and that can be used to select, trigger initiation of, or otherwise control one or more virtualization operations. Examples of user-defined virtualization criteria may include, but are not limited to, data descriptive of process types (e.g., software installation processes), specific processes (e.g., particular processes or operations associated with a software installation), file system locations (e.g., locations associated with certain data, functions, or physical memory sectors), schedules (e.g., time of day, day of month, off-peak times, peak times, operation time, non-use or shut down time, end of month, etc.), user profiles, user roles, user privileges, user types (e.g., privileged versus non-privileged users), physical locations of computing devices, network addresses, and network locations of computing devices (e.g., inside or outside of a firewall).

As an example, a user may define criteria descriptive of software installation events (e.g., a call to or initiation of an installer application or process) such that one or more virtualization operations will be automatically selected and performed when occurrences of software installation events described by the criteria are detected. For instance, a user may provide input defining a particular file type (e.g., a file having a ".msi" extension) as a criterion to control virtualization operations, or a user may provide input defining a particular file name (e.g., "setup.exe." or "install.exe") as a criterion to control virtualization operations. As described below, events such as function calls or initiation of processes associated with the user-defined criteria such as file types and/or file names may be detected and may trigger selection and performance of one or more virtualization operations.

User-defined criteria may be defined at a low level of granularity to provide significant flexibility and control over performance of virtualization operations. For example, a user may define criteria that are process specific such that virtualization operations are automatically performed only in response to and for activity (e.g., file system and configuration activity) associated with a specific process. This low-level granularity generally provides improved flexibility and control as compared to conventional system restore point technologies that merely use a static, system-wide snapshot to restore a computing system to a previous state.

FIG. 2A shows criteria manager 205 at a stage without user-defined criteria. Criteria manager 205 may receive user input defining virtualization criteria, and utilize the user-defined criteria to establish one or more sets of rules for controlling automatic virtualization operations. Such a set of rules may include one or more user-defined criteria and may be referred to as virtualization heuristic. User-defined criteria and/or virtualization heuristics may be stored by criteria manager 205. FIG. 2B illustrates a stage in which the criteria manager 205 includes a virtualization heuristic 285 and associated user-defined criteria 290.

User-defined 290 criteria may be activated, i.e., configured to control automatic virtualization operations. In certain embodiments, activation includes providing data representative of user-defined criteria 290 to virtualization engine 240. As shown in FIGS. 2A-C, criteria manager 205 is communicatively coupled to the virtualization engine 240. Data representative of one or more user-defined criteria 290 may be provided to the virtualization engine 240 using any suitable communication technologies. In certain embodiments, the data may be transmitted over network 130 using any of the communication technologies mentioned herein.

In certain embodiments, the user-defined criteria 290 may be provided to the virtualization engine 240 as part of virtualization heuristic 285. In other embodiments, the virtualization engine 240 may receive and utilize user-defined criteria 290 to establish one or more virtualization heuristics 285. Accordingly, user-defined criteria 290 may be used to establish a virtualization heuristic 285 at the criteria manager 205 or the virtualization engine 240.

Virtualization engine 240 is configured to implement and utilize user-defined criteria 290 and/or virtualization heuristics 285 to control virtualization operations. FIG. 2C shows virtualization engine 240 with data representative of an exemplary virtualization heuristic 285 and associated user-defined criteria 290 implemented therein such that the virtualization heuristic 285 and associated user-defined criteria 290 are activated and ready to be used to control virtualization operations.

As shown in FIG. 2C, virtualization engine 240 may include a detection module 280 having access to the virtualization heuristic 285 and user-defined criteria 290 implemented in the virtualization engine 240. The detection module 280 may be configured to monitor for and detect occurrences of one or more events defined by the user-defined criteria 290. As an example, the detection module 280 may detect an initiation of a software installation process identified by the user-defined criteria 290. As another example, the detection module 280 may detect a request for access to specific data or data at a particular memory location identified by the user-defined criteria 290.

The detection module 280 may be configured to use any suitable technologies to detect occurrences of events defined by the user-defined criteria. For example, the detection module 280 may monitor for certain access requests or function calls as defined by user-defined criteria 290. In certain embodiments, the detection module 280 may be implemented at an OS kernel level. For example, a filter driver configured with or having access to data representative of virtualization heuristic 285 and/or user-defined criteria 290 may be implemented at the OS kernel level and used to monitor for events defined by the criteria.

The virtualization engine 240 may be configured to automatically perform, or direct execution of, one or more virtualization operations based on the virtualization heuristic 285 and/or user-defined criteria 290. For example, in response to the detection module 280 detecting an occurrence of an event defined by the user-defined criteria 290, the virtualization engine 240 may select and initiate one or more virtualization operations, including, for example, creating one or more virtual layers, capturing file system and configuration activity and/or other data associated with the event, and storing data representative of the captured activity to the virtual layers. Exemplary virtualization processes and operations, which may be automatically initiated and performed by the virtualization engine 240 based on user defined-criteria 290, will now be described with reference to FIGS. 3A-B.

As one example, detection module 280 may detect initiation of a software install process, an event defined by the user-defined criteria 290. For instance, a user of a computing device 120 may initiate a process to install a particular software application, and the detection module 280 may detect this event. In response, virtualization engine 240 may automatically initiate one or more virtualization operations based on user-defined criteria 290, including performing and/or directing execution of any of the following operations: selectively capturing the software application, including file system and configuration activity associated with the software application and/or installation of the software application, generating one or more virtual layers, storing the captured data to the virtual layers, and generating mapping data for redirecting access requests from the base file system and configuration 230 to the virtual layers.

FIG. 2C illustrates the virtualization system 200 having the virtualization engine 240 configured to operate in a state in which there are no software applications virtually installed or enabled in the computing environment. Accordingly, the virtualization engine 240 is generally configured to permit access requests from the applications 220 to continue on to content in the base file system and configuration libraries 230.

Figure 3A:
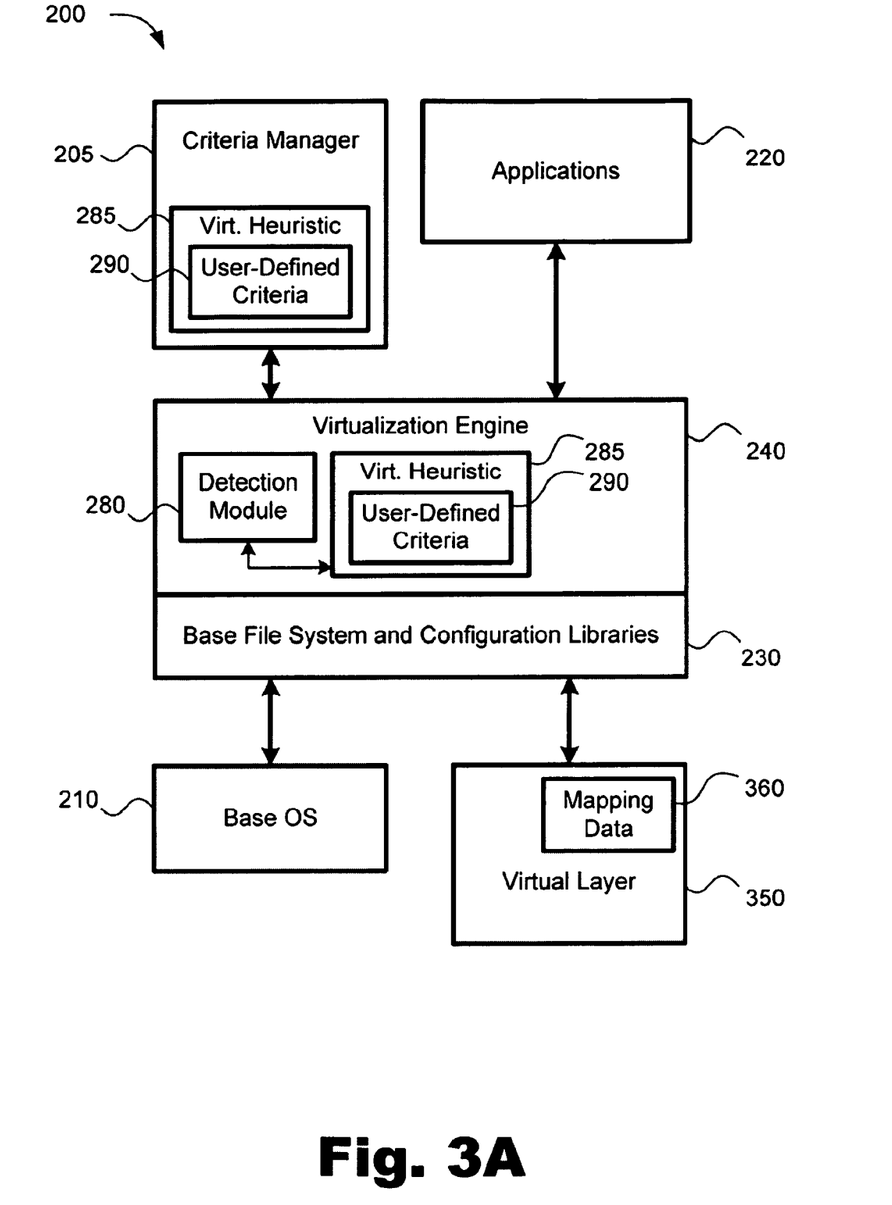
FIG. 3A illustrates the computing device environment of FIG. 2C with a virtual layer virtually installed thereto.

FIG. 3A illustrates the virtualization system 200 in a state in which initiation of a software install process for a software application has been detected and virtual operations have been performed in response to the detection to virtually install the software application and/or data related to the software application to computing device 120 as virtual layer 350. As mentioned, the virtualization engine 240 may perform any of the virtualization operations described above to virtualize the software application. In some examples, this may include creating virtual layer 350 for the application, capturing data and/or activity associated with the application (e.g., file system and configuration activity associated with an installation of the application), and storing content of the application and/or captured data to the virtual layer 350.

The virtual layer 350 may include any content and/or data, including configuration data (e.g., captured file system and configuration data) associated with the software application. The virtual layer 350 may be created at one or more memory locations that are isolated from the memory locations of the base file system and configuration 230. Instead of overwriting the memory locations of the base file system and configuration 230 as may happen in an actual installation of a software package, in a virtual installation the contents of the software package and/or other data are stored to one or more other memory locations as virtual layer 350, so as to preserve the contents of base file system and configuration 230. The virtualization engine 240 may be configured to redirect access requests for data in the base file system and configuration 230 to the virtual layer 350, as described further below.

Virtualization operations may also include generating and storing mapping data 360 for the virtual layer 350. As shown in FIG. 3A, in some embodiments the mapping data 360 may be stored in the virtual layer 350. Alternatively, the mapping data 360 may be stored at another location external of the virtual layer 350.

The mapping data 360 may include any information potentially helpful for identifying an appropriate location in memory (e.g., virtual layer 350) to which an access request should be directed. Information in the mapping data 360 may be formatted and organized in any way that is suitable for the information to be used for redirecting access requests, enabling virtual layer 350, and disabling virtual layer 350, as described further below. In certain embodiments, the mapping data 360 includes one or more tables of information organized such that the information can be searched by index, keyword, or other criterion.

As an example of generating mapping data 360, assume that an application includes a particular application object (e.g., a DLL file) designed to replace a file object that is part of the base file system and configuration 230. During virtual installation of the application, the virtualization engine 240 can identify the file object and/or its location (e.g., pathname), the application object and/or its location in the virtual layer 350, and the relationship between the file object and the application object and/or their respective locations. References to the identified information may be recorded and included as part of the mapping data 360. In this or another suitable manner, the mapping data 360 can be said to define relationships between the content of the virtual layer 350 and the content of the base file system and configuration 230.

In the configuration shown in FIG. 3A, virtual layer 350 is virtually installed but not enabled. Accordingly, the virtualization engine 240 will permit access requests (e.g., access requests generated by applications 220) to pass through to the base file system and configuration 230, without being considered for redirection to virtual layer 350. In other words, when the virtual layer 350 is not enabled, the virtualization engine 240 is configured not to redirect access requests to virtual layer 350.

Figure 3B:
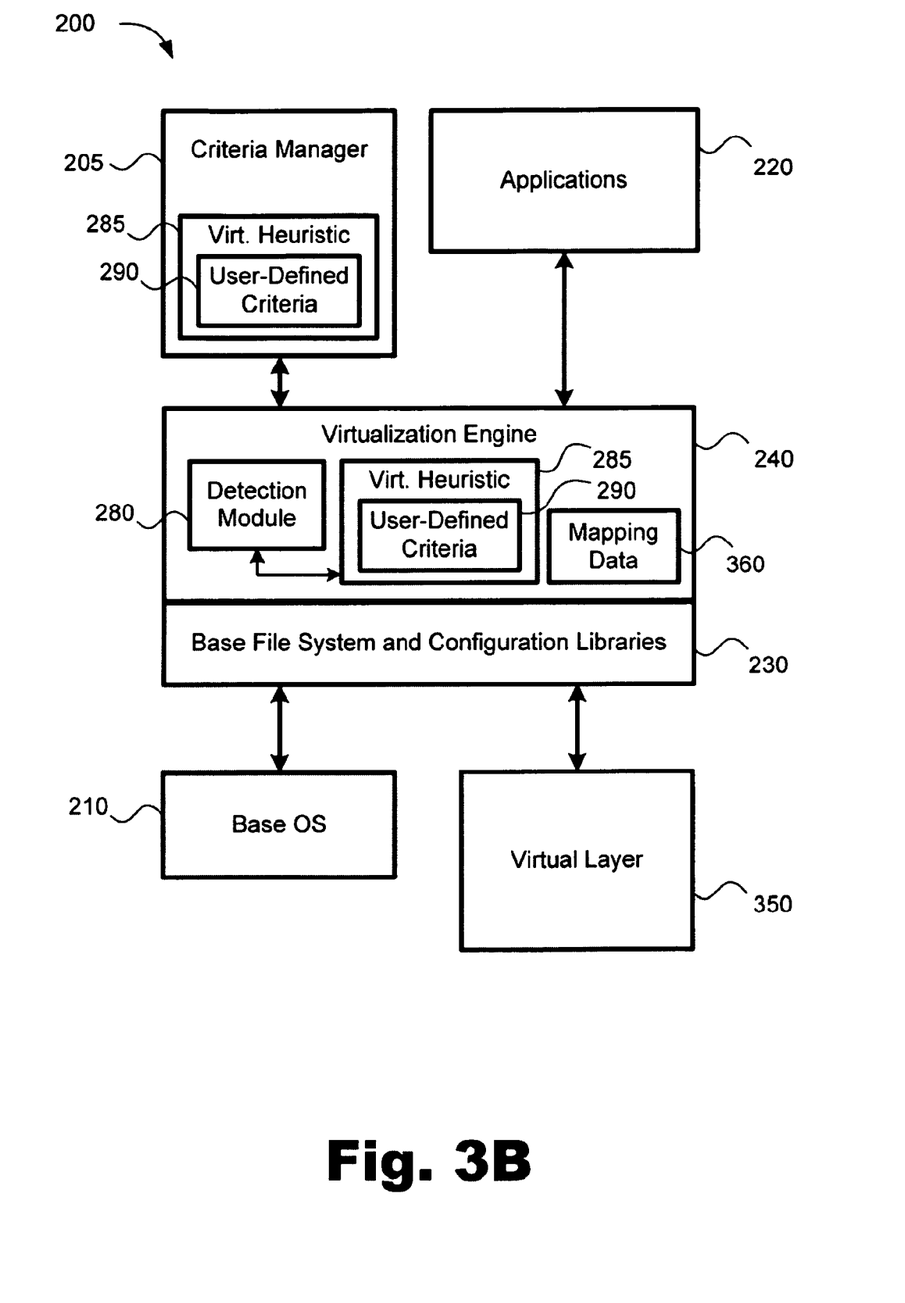
FIG. 3B illustrates the computing device environment of FIG. 3A with the virtual layer enabled.

FIG. 3B illustrates the virtualization system 200 in a state in which virtual layer 350 is virtually installed and enabled. The virtualization engine 240 may be configured to enable virtual layer 350. In certain embodiments, enablement of virtual layer 350 includes activating mapping data 360 associated with the virtual layer 350 by applying the mapping data 360 to the virtualization engine 240. In FIG. 3B, activation of mapping data 360 is represented by the mapping data 360 being moved, or a copy of the mapping data 360 being injected, into the virtualization engine 240. In certain embodiments, this includes injecting mapping data 360 into an OS kernel filter driver of the virtualization engine 240.

With mapping data 360 activated, the virtualization engine 240 is configured to selectively redirect certain access requests from the base file system and configuration 230 to virtual layer 350. For example, virtualization engine 240 may intercept an access request from an application 220, the request including a reference for a particular file object or memory location of the base file system and configuration 230. The virtualization engine 240 may use the activated mapping data 360 to determine whether the reference is associated with enabled virtual layer 350. This determination may be performed in any suitable manner, including searching the mapping data 360 for the reference. If a match is found, the virtualization engine 240 may redirect the access request to a corresponding object in virtual layer 350. The corresponding object may then be accessed and returned to the application 220, the application 220 being unaware of the redirection having taken place. Accordingly, from the view of the application 220, it is as if the content associated with the virtually installed and enabled virtual layer 350 had been actually installed to the base file system and configuration 230.

The virtualization engine 240 may be configured to selectively, individually, and conveniently disable an enabled layer, including virtual layer 350. This may be performed in any suitable manner, including removing mapping data 360 from the virtualization engine 240. For example, FIG. 3A may illustrate the virtualization system 200 in a state in which virtual layer 350 has been disabled by removing mapping data 360 from the virtualization engine 240 configuration shown in FIG. 3A. Removal of mapping data from the virtualization engine 240 may set the virtualization engine 240 to a state in which access requests for the base file system and configuration 230 will no longer be redirected to an associated disabled virtual layer 350, but will be allowed to pass through to the base file system and configuration 230.

When the virtual layer 350 is associated with a virtually installed software application, enabling the virtual layer 350 activates the software application such that its functions may be executed by a computing device 120. Disabling the virtual layer 350 deactivates the software application such it will not be executed by the computing device 120.

Automatic virtualization operations may be implemented to protect a computing device 120 and/or computer system 100. For example, a user such as a network administrator may utilize one or more tools provided by criteria manager 205 to provide user-defined criteria 290 for controlling automatic virtualization operations. The user may tailor the criteria 290 as may best suit a particular computing device 120, computing system 100, or implementation. With user-defined criteria 290 activated, virtualization engine 240 can monitor for and detect events identified by the user-defined criteria 290 and automatically and selectively perform one or more virtualization operations based on the user-defined criteria 290.

In the example described above, for instance, when a rogue installation of a software application is initiated on a computing device 120, the virtualization engine 240 may detect the installation being initiated and automatically convert the attempted actual installation to a virtual installation to protect the computing device 120 and computing system 100 from the risks associated with making changes to the base file system and configuration 230 as would normally occur in an actual installation of software.

In certain embodiments, automatic virtualization of a software application in response to a detected user-defined event may be established, in the user-defined criteria 290, as a default to be performed when the event is detected. This can, of course, be modified by a user changing the user-defined criteria 290. For example, an administrator of computing system 100 may want different automatic virtualization operations to be performed for different users. For instance, the user-defined criteria 290 may be defined such that when a user or user type having certain privileges in the computing system 100 (i.e., a "privileged user") initiates an installation of a software application, the virtualization engine 240 does not automatically perform a virtual installation in lieu of an actual installation, but instead performs some other action, such as allowing the actual installation of the software application to proceed and/or prompting the privileged user to confirm that an actual installation should be performed. When a user or user type lacking certain privileges in the computing system 100 (i.e., a "non-privileged user") initiates an installation of a software application, the virtualization engine 240 may be configured to automatically perform one or more virtual installation operations based on the user-defined criteria 290, including virtually installing the software application as described above.

Figure 4:
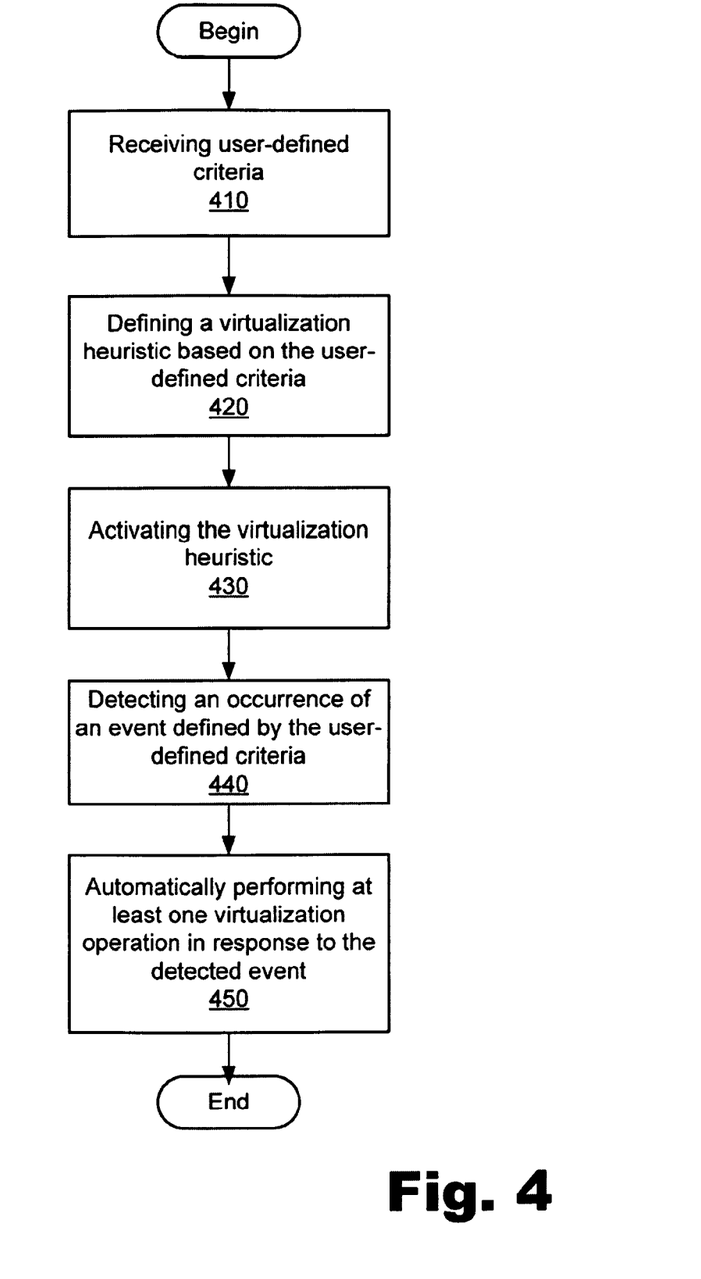
FIG. 4 illustrates an exemplary method of automatic virtualization based on user-defined criteria.

FIG. 4 illustrates an exemplary method of automatic virtualization based on user-defined criteria. While FIG. 4 illustrates exemplary steps according to one embodiment, other embodiments may omit, add to, reorder, and/or modify any of the steps shown in FIG. 4.

In step 410, user defined criteria are received. Step 410 may be performed in any of the ways described above, including the criteria manager 205 providing at least one criteria definition tool and receiving data representative of criteria provided by a user.

In step 420, at least one virtualization heuristic is defined based on the user-defined criteria. Step 420 may be performed in any of the ways described above, including criteria manager 205 utilizing the user-defined criteria to generate a set of rules to be used for selecting one or more virtualization operations to be performed based on the user-defined criteria.

In step 430, the virtualization heuristic, including the user-defined criteria, is activated. Step 430 may be performed in any of the ways described above, including criteria manager 205 providing data representative of the virtualization heuristic to the virtualization engine 240, which may implement the virtualization heuristic to be used for automatic virtualization operations, including detecting an occurrence of an event defined by the user-defined criteria and automatically selecting and performing one or more virtualization operations in response to the detected event.

In step 440, an occurrence of an event defined by the user-defined criteria is detected. Step 440 may be performed in any of the ways described above, including detection module 280 monitoring for and detecting the occurrence based on the user-defined criteria implemented in the virtualization engine 240.

In step 450, at least one virtualization operation is automatically performed in response to the event detected in step 440. The virtualization operation(s) may be selected and performed based on the virtualization heuristic including the user-defined criteria. Step 450 may be performed in any of the ways described above, including selectively capturing file system and configuration activity associated with the detected event and storing data representative of the captured file system and configuration activity to a virtual layer 350. An existing virtual layer 350 may be used, or the virtualization operation(s) may include creating the virtual layer 350. In certain embodiments, the performance of the virtualization operations virtually installs a software application as described above.

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense.

What is claimed is:

1. A method, comprising:
receiving data representative of user-defined criteria, the user-defined criteria defining an event that triggers initiation of at least one virtualization operation;
utilizing the user-defined criteria to generate a virtualization heuristic that includes a set of one or more rules for controlling the at least one virtualization operation;
implementing the virtualization heuristic within a virtualization engine configured to use the virtualization heuristic to monitor, at an operating system kernel level, for the event defined by the user-defined criteria and to automatically control the at least one virtualization operation;
detecting, by the virtualization engine, an occurrence of the event defined by the user-defined criteria, wherein detection of the occurrence of the event triggers initiation of the at least one virtualization operation; and
automatically performing the at least one virtualization operation in response to the detected event, including:
capturing file system and configuration activity associated with the detected event, the file system and configuration activity being associated with a base operating system, and
storing data representative of the captured file system and configuration activity to a virtual layer without changing a base file system and configuration of the base operating system, wherein, when the virtual layer is enabled, access requests associated with the captured file system and configuration activity are redirected from the base file system and configuration to the virtual layer.

2. The method of claim 1, wherein:
the event defined by the user-defined criteria comprises initiation of a software installation process;
the virtualization engine detects the event by monitoring for and detecting initiation of the software installation process.

3. The method of claim 2, wherein
the user-defined criteria comprises a process identifier that identifies a particular process associated with software installation.

4. The method of claim 2, wherein:
the user-defined criteria comprises data descriptive of a particular type of process;
the particular type of process comprises the software installation process.

5. The method of claim 2, wherein the
virtualization engine monitors for and detects initiation of the software installation process by monitoring for and detecting a call to the software installation process.

6. The method of claim 1, wherein the user-defined criteria include at least one of a file identifier, a file type identifier, a file extension identifier, and a file location identifier.

7. The method of claim 1, wherein the event comprises an initiation of an installation of a software application, and wherein the at least one virtualization operation includes virtually installing the software application to the virtual layer in lieu of actually installing the software application to the base operating system.

8. The method of claim 7, further comprising enabling the virtual layer to activate the software application.

9. The method of claim 1, wherein the virtualization engine comprises a filter driver that is implemented at the operating system kernel level and performs the monitoring for the event.

10. A computer program product embodied in a non-transitory computer readable medium and comprising computer instructions executable by a computing device to perform the functions of:
receiving data representative of user-defined criteria, the user-defined criteria defining an event that triggers initiation of at least one virtualization operation;
utilizing the user-defined criteria to generate a virtualization heuristic that includes a set of one or more rules for controlling the at least one virtualization operation;
implementing the virtualization heuristic within a virtualization engine configured to use the virtualization heuristic to monitor, at an operating system kernel level, for the event defined by the user-defined criteria and to automatically control the at least one virtualization operation; and
automatically selecting and performing the at least one virtualization operation in response to the event, the at least one virtualization operation being selected based on the user-defined criteria, wherein the at least one virtualization operation stores data to a virtual layer without changing a base file system and configuration of a base operating system and, when the virtual layer is enabled, access requests associated with the data stored to the virtual layer are redirected from the base file system and configuration to the virtual layer; wherein the at least one virtualization operation includes:
capturing file system and configuration activity associated with the event, and
storing data representative of the captured file system and configuration activity to the virtual layer.

11. The computer program product of claim 10, wherein the captured file system and configuration activity is selectively identified based on the user-defined criteria.

12. The computer program product of claim 10, wherein the user-defined criteria include at least one of a process identifier, a process type identifier, a file identifier, a file type identifier, a file extension identifier, a file location identifier, and schedule data.

13. The computer program product of claim 10, wherein the event comprises an initiation of an installation of a software application, and wherein the at least one virtualization operation includes virtually installing the software application in lieu of actually installing the software application to the base operating system.

14. The computer program product of claim 10, wherein the user-defined criteria define at least one user type that identifies whether a user is privileged, and wherein the at least one virtualization operation is selected based at least in part on the user type.

15. The computer program product of claim 14, wherein the at least one user type comprises a non-privileged user.

16. A system, comprising:
a software management subsystem running on a base operating system;
a computing device communicatively coupled to the software management subsystem;
a criteria manager implemented in at least one of the software management subsystem and the computing device, the criteria manager being configured to:

receive data representative of user-defined criteria, the user-defined criteria defining an event that triggers initiation of at least one virtualization operation, and utilizing the user-defined criteria to generate a virtualization heuristic that includes a set of one or more rules for controlling the at least one virtualization operation; and a virtualization engine implemented in the computing device and configured to communicate with the criteria manager, the virtualization engine being configured to implement and utilize the virtualization heuristic to monitor for and detect an occurrence of the event at an operating system kernel level, and automatically perform the at least one virtualization operation in response to the detected event, wherein the at least one virtualization operation stores data to a virtual layer without changing a base file system and configuration of the base operating system and, when the virtual layer is enabled, access requests associated with the data stored to the virtual layer are redirected from the base file system and configuration to the virtual layer; wherein the at least one virtualization operation includes:

creating the virtual layer, selectively capturing file system and configuration activity associated with the detected event, and storing data representative of the captured file system and configuration activity to the virtual layer.

17. The system of claim 16, wherein the virtualization engine is configured to select the at least one virtualization operation based on the user-defined criteria.

18. The system of claim 16, wherein the criteria manager is configured to provide at least one tool enabling a user of the software management subsystem to define the user-defined criteria, and wherein the software management subsystem is configured to transmit data representative of the user-defined criteria to the computing device for use by the virtualization engine.

* * * * *